United States Patent
Kang et al.

(10) Patent No.: US 7,683,606 B2
(45) Date of Patent: Mar. 23, 2010

(54) FLEXIBLE DISPLAY TESTING AND INSPECTION

(75) Inventors: Gary Yih-Ming Kang, Fremont, CA (US); John Hanan Liu, Mountain View, CA (US); Wanheng Wang, Pleasanton, CA (US); Yi-Shung Chaug, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 218 days.

(21) Appl. No.: 11/752,203

(22) Filed: May 22, 2007

(65) Prior Publication Data

US 2007/0296452 A1    Dec. 27, 2007

Related U.S. Application Data

(60) Provisional application No. 60/809,045, filed on May 26, 2006.

(51) Int. Cl.
    *G01R 31/02*     (2006.01)
    *G09G 3/34*     (2006.01)

(52) U.S. Cl. ............... 324/158.1; 324/770; 345/107

(58) Field of Classification Search ............ 324/770, 324/537, 753, 158.1; 345/107
See application file for complete search history.

(56) References Cited

U.S. PATENT DOCUMENTS

| | | | |
|---|---|---|---|
| 4,126,854 A | | 11/1978 | Sheridon |
| 5,930,026 A | | 7/1999 | Jacobson et al. |
| 5,961,804 A | | 10/1999 | Jacobson et al. |
| 6,025,896 A | * | 2/2000 | Hattori et al. ........ 349/86 |
| 6,727,881 B1 | * | 4/2004 | Albert et al. ........ 345/107 |
| 6,788,449 B2 | | 9/2004 | Liang et al. |
| 6,859,302 B2 | | 2/2005 | Liang et al. |
| 6,930,818 B1 | | 8/2005 | Liang et al. |
| 6,982,178 B2 | | 1/2006 | LeCain et al. |
| 7,184,197 B2 | | 2/2007 | Liang et al. |
| 7,292,386 B2 | * | 11/2007 | Kanbe ........ 359/296 |

OTHER PUBLICATIONS

Allen, K. (Oct. 2003). Electrophoretics Fulfilled. *Emerging Displays Review: Emerging Display Technologies, Monthly Report*—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

(Continued)

*Primary Examiner*—Ernest F Karlsen
(74) *Attorney, Agent, or Firm*—Howrey LLP

(57) ABSTRACT

The present invention provides methods and systems for testing and inspection of a display panel. The methods involve the application of voltages to rollers or testing conductive films. By applying a potential difference to the appropriate rollers or testing conductive films, different optical states of a display panel can be displayed for inspection.

11 Claims, 7 Drawing Sheets

OTHER PUBLICATIONS

Chen, S.M. (May 2003) The New Application and the Dynamics of Companies. *TRI.* 1-10. (In Chinese, English abstract attached).

Chung, J., Hou, J., Wang, W., Chu, L.Y., Yao, W., & Liang, R.C. (Dec. 2003). Microcup® Electrophoretic Displays, Grayscale and Color Rendition. *IDW,* AMD2/EP1-2, 243-246.

Ho, Andrew. (Nov. 2006) *Embedding e-Paper in Smart Cards, Pricing Labels & Indicators.* Presentation conducted at Smart Paper Conference Nov. 15-16, 2006, Atlanta, GA.

Ho, C.,& Liang, R.C. (Dec. 2003). *Microcup® Electronic Paper by Roll-to-Roll Manufacturing Processes.* Presentation conducted at FEG, Nei-Li, Taiwan.

Ho, Candice. (Feb. 1, 2005) *Microcupt® Electronic Paper Device and Applicaiton.* Presentation conducted at USDC 4th Annual Flexible Display Conference 2005.

Hopper and V. Novotny, An Electrophoretic Display, Its Properties, Model, and Addressing. *IEEE Trans. Electr. Dev.*, 26(8):1148-1152, (1979).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup® Electronic Paper—an Introduction. *Advanced Display*, Issue 37, 4-9 (in Chinese, English abstract attached).

Liang, R.C. (Feb. 2003) *Microcup® Electrophoretic and Liquid Crystal Displays by Roll-to-Roll Manufacturing Processes.* Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process.* Presentation at the Flexible Displays & Electronics 2004 of Intertech, San Fransisco, California, USA.

Liang, R.C. (Oct. 2004) *Flexible and Roll-able Displays/Electronic Paper—A Technology Overview.* Paper presented at the METS 2004 Conference in Taipie, Taiwan.

Liang, R.C., & Tseng, S. (Feb. 2003). *Microcup® LCD, A New Type of Dispersed LCD by a Roll-to-Roll Manufacturing Process.* Paper presented at the IDMC, Taipei, Taiwan.

Liang, R.C., (Feb. 2005) *Flexible and Roll-able Displays/Electronic Paper—A Brief Technology Overview.* Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup® Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup® Electrophoretic Displays.* Paper presented at the IDMC, Taipei, Taiwan.

Liang, R.C., Hou, J., Zang, H.M., Chung, J., & Tseng, S. (2003). Microcup® displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup® Electronic Paper by Roll-to-Roll Manufacturing Process >>, Presentation conducted at the 14th FPD Manufacturing Technology EXPO & Conference.

Mossman, M.A. et al (2001) New Reflective Display Based on Total Internal Reflection in Prismatic Microstructure. *SID IDRC Proceedings*, pp. 311.

Mossman, M.A., et al (2001) New Reflective Color Display Techniques Based on Total Internal Reflection and Subtractive Color Filtering. *SID 01 Digest*, pp. 1054, (2001).

Mossman, M.A., et al. (2002) Grey Scale Control of TIR Using Electrophoresis of Sub-Optical Pigment Particles, *SID 02 Digest*, pp. 522.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display.* The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process.* Presentation conducted at $2^{nd}$ Annual Paper-Like Displays Conference, Feb. 9-11, 2005, St. Pete Beach, Florida.

Zang, H.M. (Oct. 2003). *Microcup® Electronic Paper by Roll-to-Roll Manufacturing Processes.* Presentation conducted at the Advisory Board Meeting, Bowling Green State University, Ohio, USA.

Zang, H.M. (Feb. 2004). *Microcup Electronic Paper.* Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developms in Microcup® Flexible Displays.* Presidentaiton conducted at the 6th Annual Flexible Display and Microelectronics Conference, Phoenix, AZ Feb. 6-8.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

* cited by examiner

FLEXIBLE DISPLAY TESTING AND INSPECTION

This application claims priority to U.S provisional application No. 60/809,045, filed May 26, 2006. The content of which is incorporated herein by reference in its entirety.

FIELD OF THE INVENTION

The present invention provides methods and systems for testing and inspection of a display panel.

BACKGROUND OF THE INVENTION

The electrophoretic display (EPD) is a non-emissive device based on the electrophoresis phenomenon influencing the migration of charged pigment particles in a solvent, preferably in a dielectric solvent. More specifically, an electrophoretic fluid comprising charged pigment particles dispersed in a dielectric solvent is enclosed between two electrode plates. At least one of the electrode plates is transparent and such a transparent plate is usually the viewing side. When a voltage difference is imposed between the two electrode plates, the charged pigment particles migrate by attraction to the electrode plate of polarity opposite that of the charged pigment particles. Thus, the color showing at the viewing side may be either the color of the dielectric solvent or the color of the charged pigment particles. Reversal of plate polarity will cause the particles to migrate back to the opposite electrode plate, thereby reversing the color. Alternatively, two types of pigment particles of different colors and polarities may be dispersed in a solvent. In this case, when a voltage difference is imposed between the two electrode plates, the color showing at the viewing side would be one of the two colors of the pigment particles. Reversal of plate polarity will cause the two types of pigment particles to switch positions, thus reversing the color.

Intermediate color density (or shades of gray) due to intermediate pigment density at the transparent plate may be obtained by controlling the plate charge through a range of voltages or pulsing time.

EPDs of different pixel or cell structures have been reported previously, for example, the partition-type EPD [M. A. Hopper and V. Novotny, IEEE Trans. Electr. Dev., Vol. ED 26, No. 8, pp. 1148-1152 (1979)], the microencapsulated EPD (U.S. Pat. Nos. 5,961,804 and 5,930,026 and U.S. applications, Ser. No. 60/443,893, filed Jan. 30, 2003 and Ser. No. 10/766,757, filed on Jan. 27, 2004) and the total internal reflection (TIR) type of EPD using microprisms or microgrooves as disclosed in M. A. Mossman, et al, SID 01 Digest pp. 1054 (2001); SID IDRC proceedings, pp. 311 (2001); and SID'02 Digest, pp. 522 (2002).

An improved EPD technology was disclosed in U.S. Pat. Nos. 6,930,818, 6,859,302 and 6,788,449, the contents of all of which are incorporated herein by reference in their entirety. The improved electrophoretic display comprises isolated display cells formed from microcups which are filled with charged pigment particles dispersed in a dielectric solvent. To confine and isolate the electrophoretic fluid in the microcups, the filled microcups are top-sealed with a polymeric sealing layer, preferably formed from a composition comprising a material selected from the group consisting of thermoplastics, thermoplastic elastomers, thermosets and precursors thereof. The US patents identified above also disclose a roll-to-roll process for manufacturing electrophoretic displays. With a roll-to-roll manufacturing process, in-line testing and inspection of the electrophoretic display panel produced is highly desirable.

Currently, inspection of an electrophoretic display panel is often carried out by applying a temporary conductive layer to the display panel. The temporary conductive layer is on the opposite side of one of the two electrode plates already in place. When a voltage difference is applied between the temporary conductive layer and the electrode plate, the performance of the display panel (i.e., switching of the charged pigment particles) can be visually inspected. The temporary conductive layer, however, has to be removed before the second electrode plate is applied, to complete the assembly. The use of a temporary conductive layer therefore is not an efficient and cost-effective way for testing and inspection.

An alternative method for inspection is performed on a transparent electrostatic chuck equipped with an ionographic printing head. In this method, after the display panel is placed and aligned with the electrostatic chuck, the ionographic printing head drives the electrophoretic fluid to an optically saturated state by projecting a beam of ions onto a release film laminated to the display panel. This method does not need a temporary conductive film. However, it needs a voltage much higher than the driving voltage for the display panel to switch the display fluid between optical states. This could cause damage to the display panel, even cause injury to the operator. Besides, the method can only be performed in a sheet-by-sheet manner, not suitable for roll-to-roll in-line inspection.

SUMMARY OF THE PRESENT INVENTION

The present invention provides methods for testing and inspection of a display panel.

The first aspect of the invention is directed to a method for testing and inspecting a display panel which comprises a conductive layer and a display medium layer in contact with the conductive layer wherein said conductive layer has at least one exposed edge. The method comprises:

a) providing a ground voltage supplier to supply a ground voltage to the exposed edge of the conductive layer;

b) providing a testing voltage supplier to supply a testing voltage to the display medium layer;

c) applying different voltages to the ground voltage supplier and the testing voltage supplier; and d) inspecting for defects.

In one embodiment of the first aspect of the invention, the ground voltage supplier is a set of rollers comprising a ground voltage roller and its corresponding nip roller whereby the exposed edge of the conductive layer is in contact with the ground voltage roller.

In another embodiment of the first aspect of the invention, the testing voltage supplier is a set of rollers comprising a testing voltage roller and its corresponding nip roller whereby the display medium layer is in contact with the testing voltage roller.

In a further embodiment of the first aspect of the invention, the testing voltage supplier is a testing voltage conductive film and a set of rollers comprising a testing voltage roller and its corresponding nip roller whereby the testing voltage conductive film has a conductive surface which is in contact with the display medium layer and the testing voltage roller.

In yet a further embodiment of the first aspect of the invention, the testing voltage supplier is a testing voltage roller which is in contact with the display medium layer.

The second aspect of the invention is directed to a method of the first aspect of the invention further comprising:

e) providing a second testing voltage supplier; and f) applying a voltage to the second testing voltage supplier which is opposite of that applied to the first testing voltage supplier in relation to the voltage applied to the ground voltage supplier.

In one embodiment of the second aspect of the invention, the first testing voltage supplier is a first set of rollers comprising a first testing voltage roller and its corresponding nip roller whereby the display medium layer is in contact with the first testing voltage roller and the second testing voltage supplier is a second set of rollers comprising a second testing voltage roller and its corresponding nip roller whereby the display medium layer is in contact with the second testing voltage roller.

In another embodiment of the second aspect of the invention, the first testing voltage supplier is a first set of rollers comprising a first testing voltage roller and its corresponding nip roller whereby the display medium layer is in contact with the first testing voltage roller and the second testing voltage supplier is a testing voltage conductive film and a second set of rollers comprising a second testing voltage roller and its corresponding nip roller whereby the testing voltage conductive film has a conductive surface which is in contact with the display medium layer and the second testing voltage roller.

In a further embodiment of the second aspect of the invention, the first testing voltage supplier is a testing voltage conductive film and a first set of rollers comprising a first testing voltage roller and its corresponding nip roller whereby the testing voltage conductive film has a conductive surface which is in contact with the display medium layer and the first testing voltage roller and the second testing voltage supplier is a second set of rollers comprising a second testing voltage roller and its corresponding nip roller whereby the display medium layer is in contact with the second testing voltage roller.

In yet a further embodiment of the second aspect of the invention, the first testing voltage supplier is a first testing voltage conductive film and a first set of rollers comprising a first testing voltage roller and its corresponding nip roller whereby the first testing voltage conductive film has a conductive surface which is in contact with the display medium layer and the first testing voltage roller and the second testing voltage supplier is a second testing voltage conductive film and a second set of rollers comprising a second testing voltage roller and its corresponding nip roller whereby the second testing voltage conductive film has a conductive surface which is in contact with the display medium layer and the second testing voltage roller.

The third aspect of the invention is directed to a testing and inspection system. The system comprises:

i) a display panel comprising a conductive layer and a display medium layer in contact with the conductive layer wherein the conductive layer has at least one exposed edge;
ii) a ground voltage supplier to supply a ground voltage to the exposed edge of the conductive layer; and
iii) a testing voltage supplier to supply a testing voltage to the display medium layer.

In one embodiment of the third aspect of the invention, the ground voltage supplier is a set of rollers comprising a ground voltage roller and its corresponding nip roller.

In another embodiment of the third aspect of the invention, the testing voltage supplier is a set of rollers comprising a testing voltage roller and its corresponding nip roller wherein the display medium layer is in contact with the testing voltage roller.

In a further embodiment of the third aspect of the invention, the testing voltage supplier is a testing voltage conductive film and a set of rollers comprising a testing voltage roller and its corresponding nip roller wherein the testing voltage conductive film has a conductive surface which is in contact with the display medium layer and the testing voltage roller.

In yet a further embodiment of the third aspect of the invention, the testing voltage supplier is a testing voltage roller which is in contact with the display medium layer.

The fourth aspect of the present invention is directed to a testing and inspection system of the third aspect of the invention further comprising a second testing voltage supplier.

In one embodiment of the fourth aspect of the invention, the testing voltage supplier is a first set of rollers comprising a first testing voltage roller and its corresponding nip roller whereby the display medium layer is in contact with the first testing voltage roller and the second testing voltage supplier is a second set of rollers comprising a second testing voltage roller and its corresponding nip roller whereby the display medium layer is in contact with the second testing voltage roller.

In another embodiment of the fourth aspect of the invention, the first testing voltage supplier is a first set of rollers comprising a first testing voltage roller and its corresponding nip roller whereby the display medium layer is in contact with the first testing voltage roller and the second testing voltage supplier is a testing voltage conductive film and a second set of rollers comprising a second testing voltage roller and its corresponding nip roller whereby the testing voltage conductive film has a conductive surface which is in contact with the display medium layer and the second testing voltage roller.

In a further embodiment of the fourth aspect of the invention, the first testing voltage supplier is a testing voltage conductive film and a first set of rollers comprising a first testing voltage roller and its corresponding nip roller whereby the testing voltage conductive film has a conductive surface which is in contact with the display medium layer and the first testing voltage roller and the second testing voltage supplier is a second set of rollers comprising a second testing voltage roller and its corresponding nip roller whereby the display medium layer is in contact with the second testing voltage roller.

In yet a further embodiment of the fourth aspect of the invention, the first testing voltage supplier is a first testing voltage conductive film and a first set of rollers comprising a first testing voltage roller and its corresponding nip roller whereby the first testing voltage conductive film has a conductive surface which is in contact with the display medium layer and the first testing voltage roller and the second testing voltage supplier is a second testing voltage conductive film and a second set of rollers comprising a second testing voltage roller and its corresponding nip roller whereby the second testing voltage conductive film has a conductive surface which is in contact with the display medium layer and the second testing voltage roller.

In any of the testing and inspection system of the invention, there may be a light source.

In any of the testing and inspection system of the invention, the display medium layer may be an electrophoretic display medium layer.

In any of the testing and inspection system of the invention, the display medium layer may be a liquid crystal composition layer.

The methods and systems as described allow in-line inspection of the defects of a display panel right after it is manufactured. Therefore the methods and systems can be part of a roll-to-roll manufacturing process. The methods and systems may also be applied off the manufacturing line.

DETAILED DESCRIPTION OF THE PRESENT INVENTION

Figure 1:
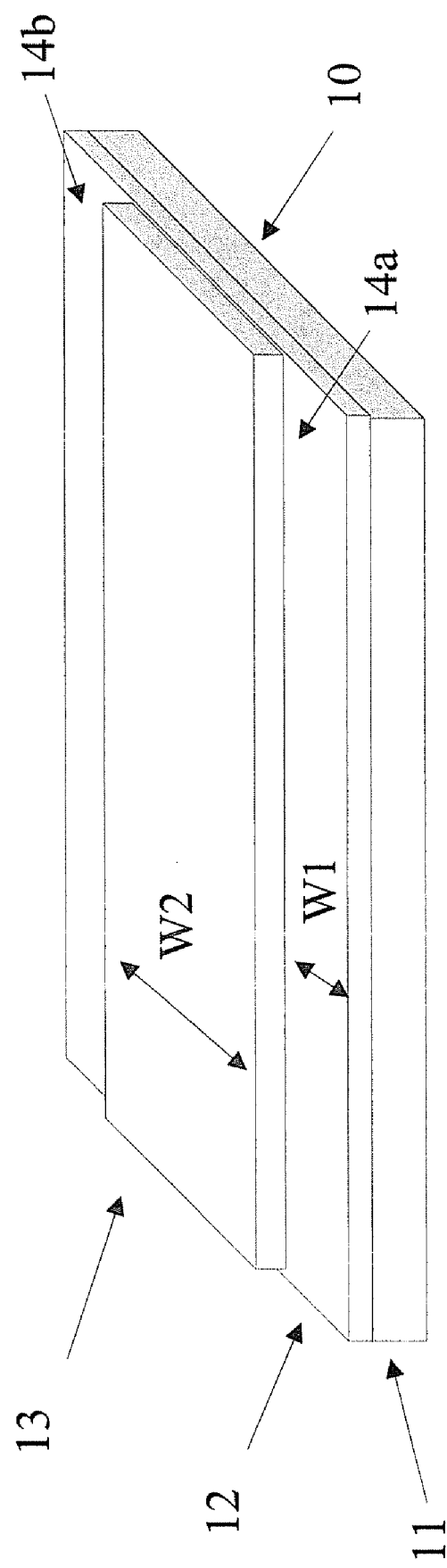
FIG. 1 illustrates a display panel suitable for the testing and inspection methods of the present invention.

FIG. 1 shows a flexible display panel typically used in the present methods. As shown, the display panel (10) comprises a transparent substrate (11) (e.g., PET), a transparent conductive layer (12) (e.g., ITO) and a layer of display cells filled with a display fluid. For brevity, the layer of display cells filled with a display fluid may be referred to as a display medium layer (13).

There may be an adhesive layer (not shown) present between the transparent conductive layer (12) and the display medium layer (13) or on top of the display medium layer.

The transparent conductive layer (12) may either cover the entire surface of the transparent substrate or be patterned. The commercially available conductive layer (12) usually is supplied on a substrate (11). There may be other material layers on the conductive layer (12), opposite from the display medium layer; however, it is not essential to have the extra layers.

Normally, one of the edges (14a and 14b) of the transparent conductive layer (12) is not covered by the display medium layer (as shown). However both edges may be exposed. The exposed edge(s) (14a and 14b) of the transparent conductive layer will be used as a common electrode to drive the display panel for inspection.

The display fluid may be an electrophoretic fluid, a liquid crystal composition, an electrochromic composition, a twisting ball composition (e.g., U.S. Pat. No. 4,126,854) or the like. The methods of the present invention may be applied to any of the display devices previously known, such as those described in the Background section. Throughout this application, for illustration purpose, an electrophoretic medium is used. However it is understood that the methods are suitable for any type of display panel as long as the operation of the display panel is driven by an electrical field, especially by two opposing electrode plates.

In one embodiment of the present invention, the inspection method is applied to a microcup-based display panel. In this embodiment, the display panel may comprise the microcup-based display cells formed on a substrate layer or on an electrode layer. The display cells are filled with a display fluid and sealed with a polymeric sealing layer. The sealing layer may be formed by any of the sealing methods as described in U.S. Pat. No. 6,930,818, the content of which is incorporated herein by reference in its entirety. The microcup-based display panel may further optionally comprise a primer layer and/or an adhesive layer.

Figure 2A:
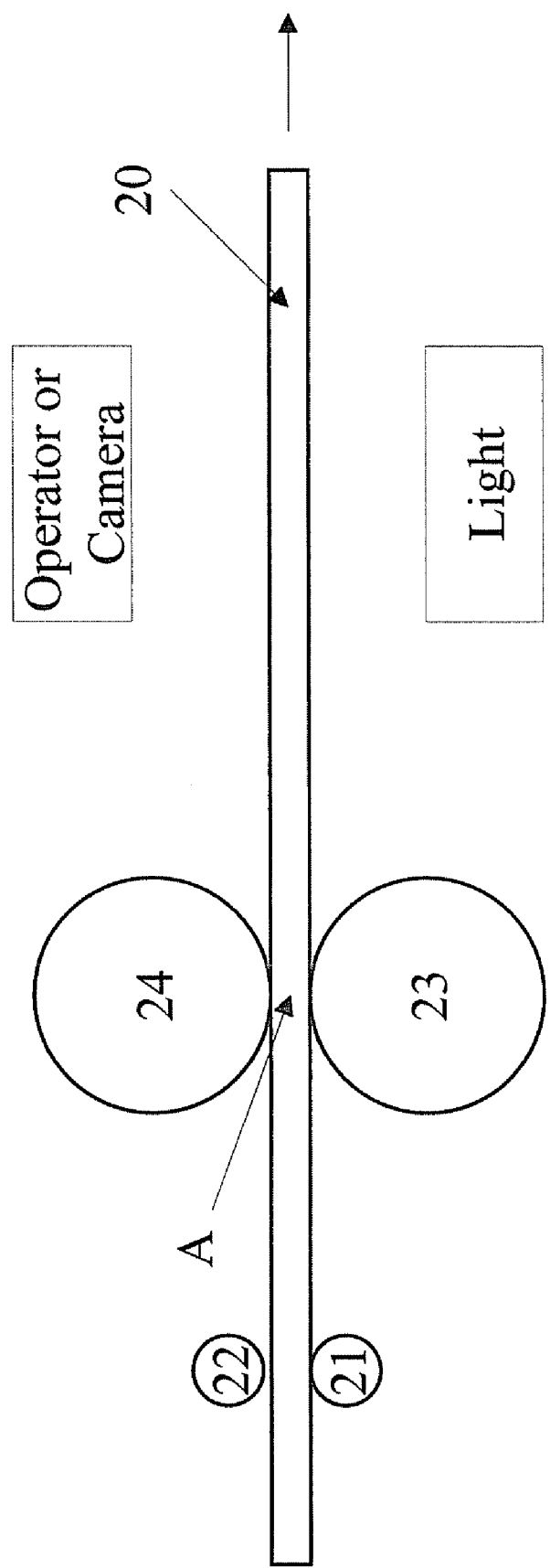
FIGS. 2a and 2b illustrate a method of the present invention with one set of testing voltage rollers.
Figure 2B:
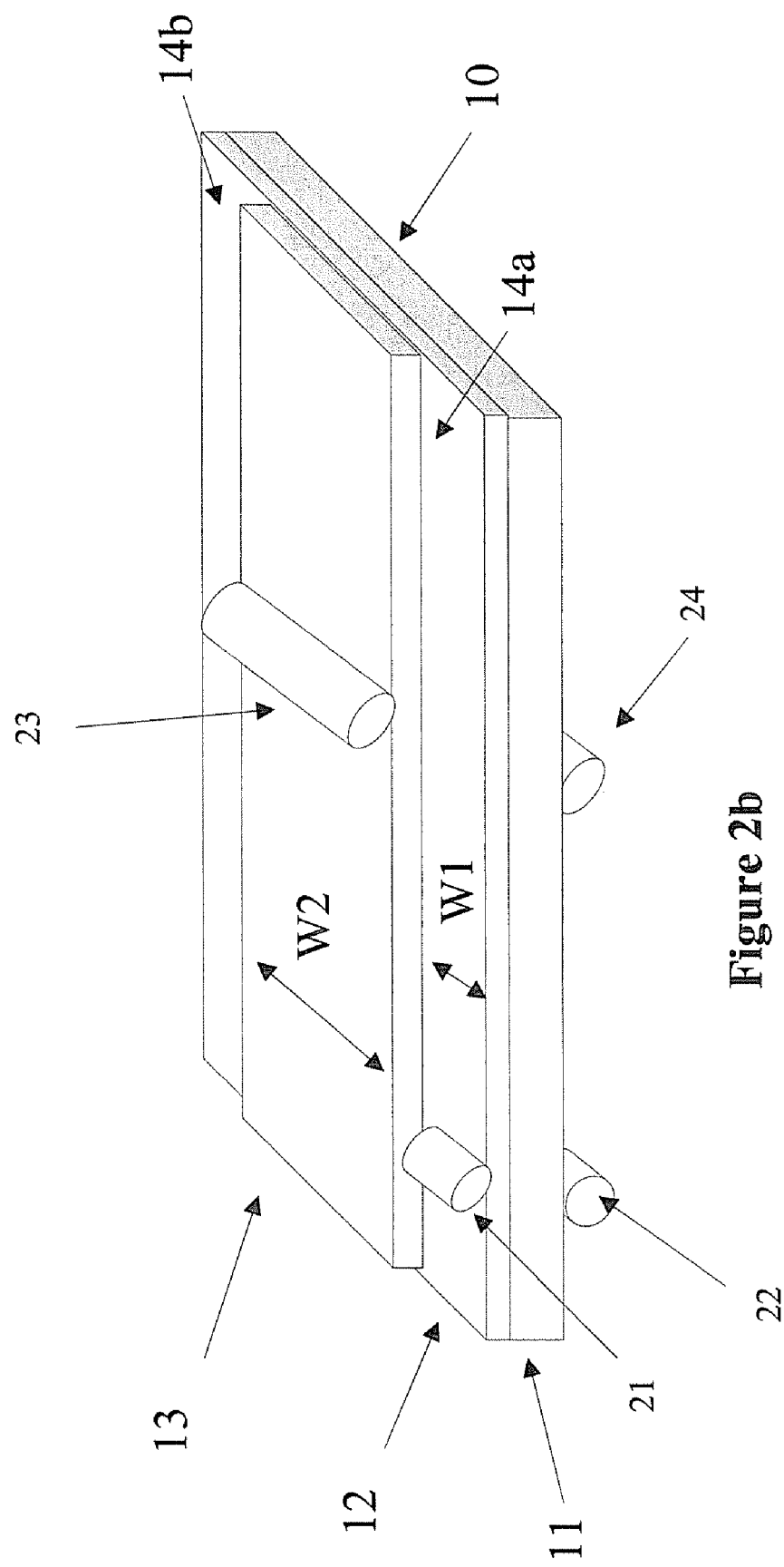

FIG. 2a shows one of the methods of the present invention. A display panel as described in FIG. 1 is used in the method of FIG. 2a. The display panel on a web is moving in one direction as shown. In this embodiment, the display panel (20) passes through two sets of rollers, i.e., a ground voltage roller (21) and a corresponding nip roller (22) and a testing voltage roller (23) and its corresponding nip roller (24). While the display panel (20) is expressed as a single layer in FIG. 2a for convenience, the display panel in practice comprises a conductive layer and a display medium layer, as shown in FIG. 1. In the method of FIG. 2a, only the exposed edge (14a) of the conductive layer (12) and the corresponding substrate layer (11) are allowed to pass through the gap between the ground voltage roller (21) and the corresponding nip roller (22). In the display medium layer area, the display medium layer (13), the corresponding conductive layer (12) and the substrate layer (11) are allowed to pass through the gap between the testing voltage roller (23) and the corresponding nip roller (24). For clarity, FIG. 2b is a three dimensional view of the method of FIG. 2a.

In FIG. 2a, the display panel is placed with the transparent conductive layer and the display medium layer facing down because the ground voltage roller 21 and the testing voltage roller 23 are shown to be under the display panel. In FIG. 2b, the display panel is placed with the transparent conductive layer and the display medium layer facing up because the ground voltage roller (21) and the testing voltage roller (23) are placed above the panel. The method may be carried out in either way.

The nip roller (22) is wrapped or mounted with a non-rigid material, e.g., silicon rubber, polyurethane or the like. The ground voltage roller (21) can be either a metal cylinder or a metal sleeve mounted on a cylinder. In any case, the outer surface of the ground voltage roller is a conductive metal, preferably being chrome-coated and polished.

An appropriate amount of pressure is applied between the nip roller (22) and ground voltage roller (21) so that the exposed edge of the conductive layer and the corresponding substrate layer are tightly clamped between them; but still allowed to move through the gap between the two rollers with ease.

The function of the ground voltage roller is to apply an electrical voltage to the transparent conductive layer (usually ground).

Figure 3B:
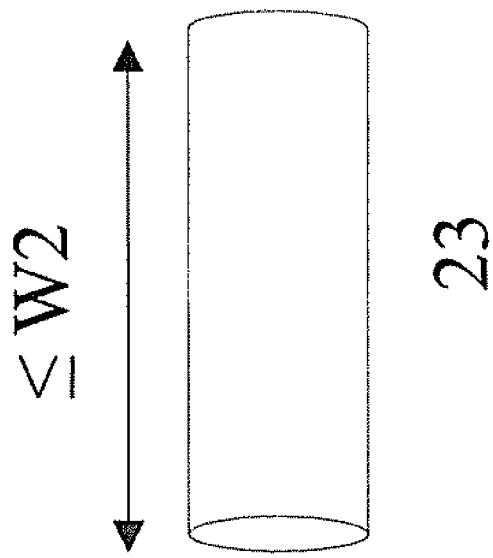
FIGS. 3a and 3b illustrate the configuration of the rollers used in the present methods.
Figure 3A:
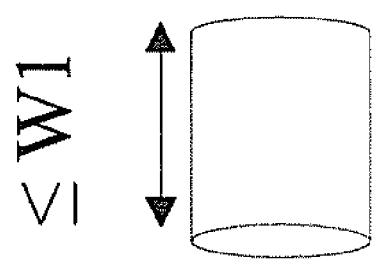

The longitudinal length of the two rollers (21 and 22) does not exceed the width (w1) of the exposed edge (14a or 14b) of the transparent conductive layer (see FIG. 3a) and therefore the two rollers are only in contact with the edge of the conductive layer to supply a voltage to the transparent conductive layer (12) of the display panel. In some cases, rollers 21 or 22 may be wider than the width (w1), but the contact width of the ground voltage roller (21) to the exposed edge of the conductive layer does not exceed the width (w1).

For the second set of rollers 23 and 24, the nip roller (24) is also wrapped or mounted with a non-rigid material whereas the testing voltage roller (23) is either a metal cylinder or a metal sleeve mounted on a cylinder. In any case, the outer surface of the testing voltage roller is a conductive metal. In some cases, the conductive surface of the testing voltage roller may be patterned to drive a special pattern on the display panel. There is, if the display medium layer is a little sticky on its surface, an optional thin layer of a release coating on the outer surface of the testing voltage roller to decrease the adhesion between the display medium layer and the testing voltage roller. The longitudinal length of this second set of rollers may be the same as, or a little shorter than, the width (w2) of the display medium layer (see FIG. 3b). The two rollers (23 and 24) preferably have the same longitudinal length. The contacting length between the testing voltage roller (23) and the display medium layer is preferably slightly shorter than the width of the medium layer to avoid electrical short between the testing voltage roller (23) and the transparent conductive layer (12).

During the inspection process, different voltages are applied to the ground voltage roller 21 and the testing voltage roller 23 and hence an electrical field is created at the nipped area (point A) between rollers 23 and 24 to cause the display of one color state (e.g., the color of the charged pigment particles or the color of the solvent) of the display medium layer. When the voltages applied are reversed, the other color state is displayed.

After the display panel passes through rollers 23 and 24 (i.e., point A) and is switched to a desired color state, the display panel is visually inspected by an operator for defects (e.g., areas, locations and counts). The inspection may also be automated by using an inspection equipment to identify the defects. In either case, a light source may be placed on the opposite side of the operator or the inspection equipment, as shown in FIG. 2a, to increase the accuracy and speed of inspection. In the automated inspection system, a camera or computer may also be used to record the inspection results.

In the inspection system, the display panel is placed in such a manner that the exposed edge of the transparent conductor layer and the display medium layer are in contact with the ground voltage roller (21) and the testing voltage roller (23), respectively, to allow application of voltages to the transparent conductive layer and the display medium layer.

In FIGS. 2a and 2b, the sizes (i.e., diameter) of rollers 21 and 22 appear to be smaller than that of rollers 23 and 24. However in practice, the sizes of the rollers may vary and they have no significant effect on the efficiency of the inspection system. This applies to other figures as well.

In the system illustrated in FIGS. 2a and 2b, there is only one set of a testing voltage roller and its corresponding nip roller. For brevity, this system is referred to as a "one testing voltage roller system". In such a "one testing voltage roller system", the display panel has to pass the system at least twice in order to be inspected for the two color states.

Figure 2C:
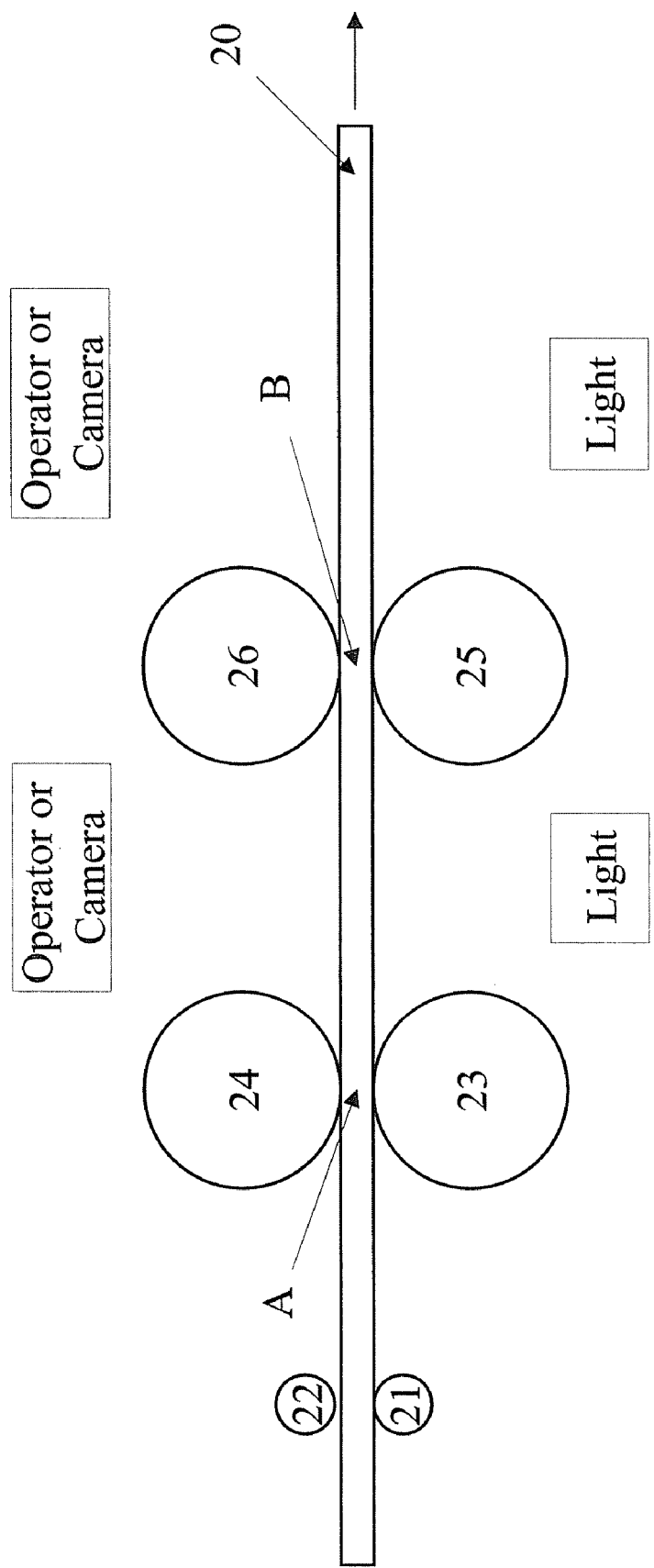
FIG. 2c illustrates an alternative method of the present invention with two sets of testing voltage rollers.

It is also possible to have a continuous inspection process for two color states. For instance, if there is a third set of rollers as shown in FIG. 2c, two color states can be inspected in a continuous process. The system of FIG. 2c may be referred to as a "two testing voltage roller system". The third set of rollers (25 and 26) is similarly placed as the set of rollers 23 and 24, with roller 25 being a testing voltage roller and roller 26 being a nip roller. In this case, while the display panel is continuously moving, opposite voltages (in relation to the voltage applied to the ground voltage roller 21) are applied to roller 23 and roller 25. As a result, one color state is displayed between the first nipped area (point A) and the second nipped area (point B) and the other color state is displayed after point B and therefore two color states can be continuously inspected without interruption.

As with FIG. 2a, the display panel (20) in FIG. 2c is expressed as a single layer for convenience. The display panel in practice comprises a conductive layer and a display medium layer. Only the exposed edge (14a) of the conductive layer (12) and the corresponding substrate layer (11) are allowed to pass through the gap between the ground voltage roller (21) and its corresponding nip roller (22). In the display medium layer area, the display medium layer (13), the corresponding conductive layer (12) and the substrate layer (11) are allowed to pass through the gap between the testing voltage roller (23) and the corresponding nip roller (24) and the gap between the testing voltage roller (25) and the corresponding nip roller (26). In FIG. 2c, the display panel is also placed with the transparent conductive layer and the display medium layer facing down.

Figure 4:
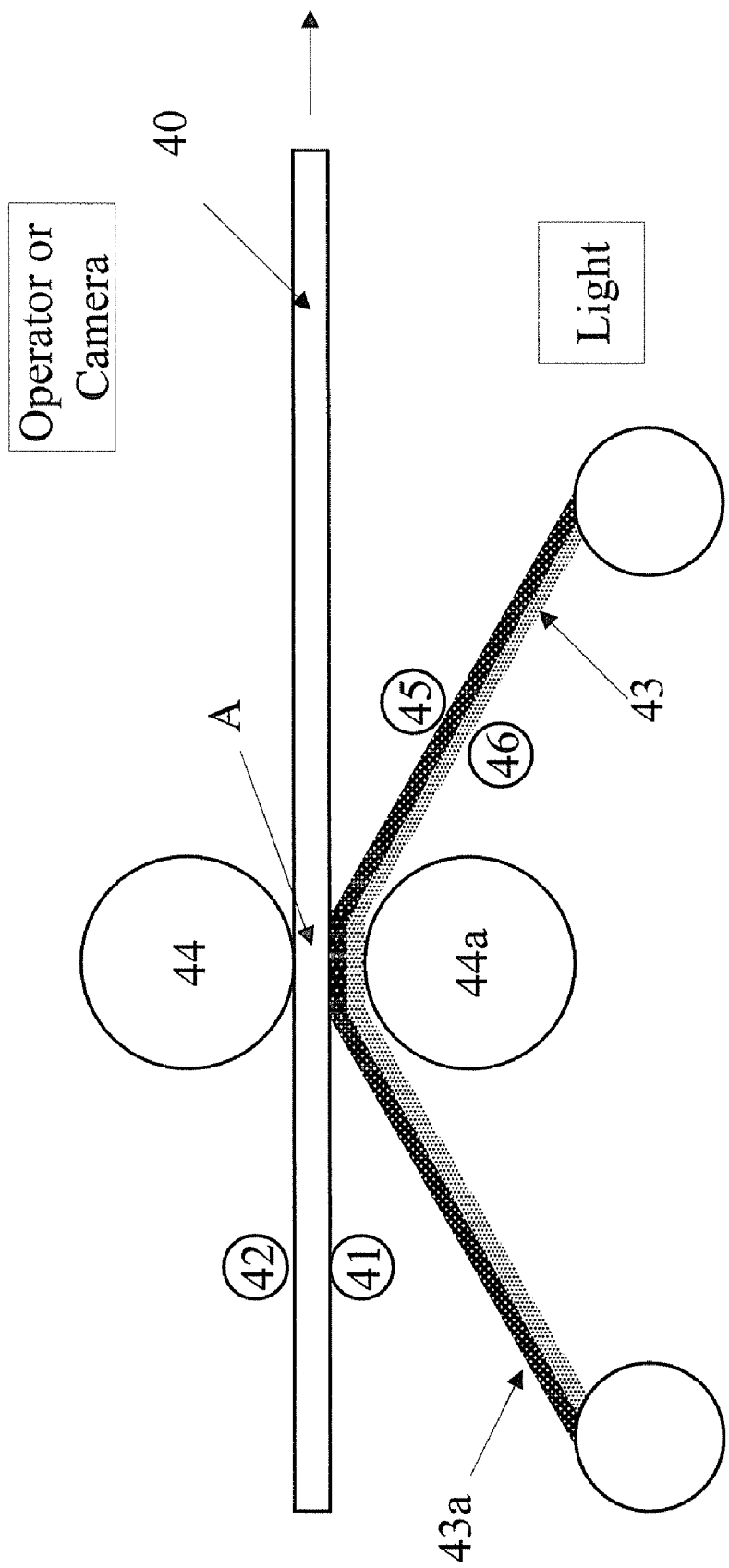
FIGS. 4 and 5 illustrate alternative testing and inspection methods of the present invention.

FIG. 4 provides another alternative method for roll-to-roll inspection of a display panel. The principle and mechanism of FIGS. 2a and 4 are similar, except that a testing voltage conductive film (43) or belt (not shown) with a conductive surface (43a) is used to replace the testing voltage roller 23 in FIG. 2a. The roller 41, 42 and 44 are the same as rollers 21, 22 and 24 in FIG. 2a, respectively. The display panel of FIG. 1 is used and the exposed edge of the conductive layer and the corresponding substrate layer are allowed to pass through the gap between rollers 41 and 42. The ground voltage roller 41 is in contact with the exposed edge of the conductive layer. Roller 44a in this case may be a nip roller which does not have a conductive surface or a metal roller. In this method, another set of rollers 45 and 46 is needed to apply a voltage to the testing voltage conductive film for switching the display medium layer of the display panel. In FIG. 4, roller 46 is a nip roller whereas roller 45 which is in contact with the conductive surface 43a is a testing voltage roller which also has a conductive surface.

The display panel (40) is expressed as a single layer in FIG. 4 for convenience, the display panel in practice comprises a conductive layer and a display medium layer. Only the exposed edge (14a) of the conductive layer (12) and the corresponding substrate layer (11) are allowed to pass through the gap between the ground voltage roller (41) and its corresponding nip roller (42). In the display medium layer area, the display medium layer (13), the corresponding conductive layer (12) and the substrate layer (11) are allowed to pass through the gap between the testing voltage conductive film (43) and the nip roller (44). The conductive surface (43a) of the testing voltage conductive film (43) is in contact with the display medium layer. In FIG. 4, the display panel is placed with the transparent conductive layer and the display medium layer facing down.

The length of the testing voltage conductive film is preferably longer than that of display panel; but the width of the testing voltage conductive film is either the same as, or shorter than, the width of the display medium layer. There may be a release coating over the top surface of the testing voltage conductive film. In the process of testing and inspection, different voltages are applied to rollers 41 and 45, thus creating an electrical field at the nipped area (point A) between rollers 44 and 44a to cause the display of one color state of the display medium layer. The system of FIG. 4 may be referred to as a "one testing voltage conductive film system".

In this embodiment, it is also possible to have a continuous inspection process by installing a second testing voltage conductive film with another set of rollers similar to that of 43, 45 and 46, respectively.

The second testing voltage conductive film and rollers are installed in an appropriate position of the assembly of FIG. 4 (e.g., downstream of the conductive film 43 and rollers 45 and 46 in the figure). This system may be referred to as a "two testing voltage conductive film system". During inspection utilizing this system, opposite voltages (in relation to the voltage applied to the ground voltage roller 41) are applied to roller 45 and the testing voltage roller associated with the second testing voltage conductive film.

It is also possible to combine a "one testing voltage roller system" with a "one testing voltage conductive film system", for continuous inspection of the two color states.

Figure 5:
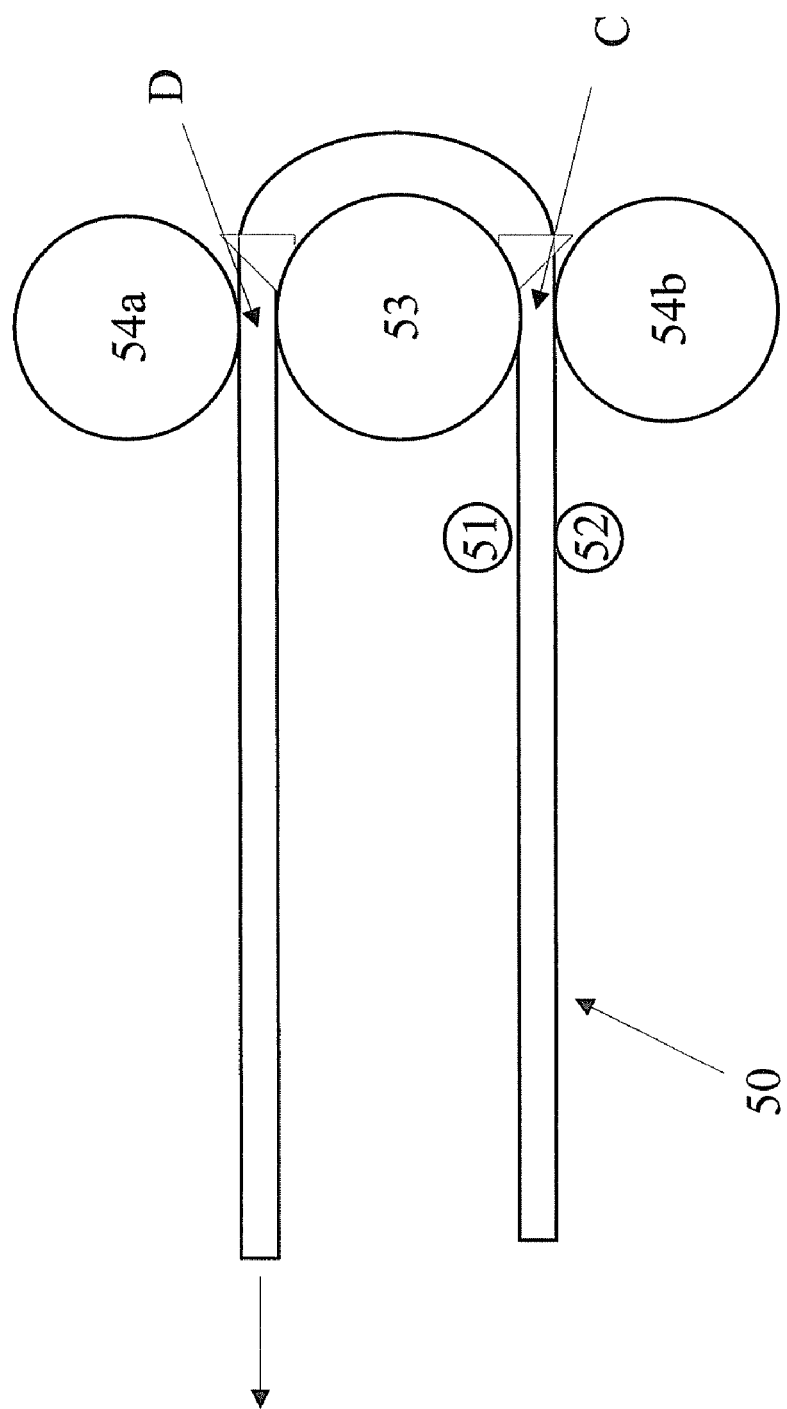

FIG. 5 shows a further method for roll-to-roll testing and inspection of a display panel. In this method, the first set of rollers (51 and 52) are the ground voltage roller (51) and its corresponding nip roller (52). The rollers 51 (ground voltage roller) and 52 (nip roller) clamp only the exposed edge of the conductive layer and the corresponding substrate layer. However, a display panel 50, in this case, with a display medium layer facing inside (i.e., in contact with roller 53), passes through the gaps between a testing voltage roller 53 and two non-rigid rollers 54a and 54b, under an appropriate pressure. The non-rigid rollers 54a and 54b serve as nip rollers and they do not have a conductive surface. The display panel has a longer contact period with the testing voltage roller 53 (from point C to point D). Therefore, the web speed can be increased. In this method, the web can move in a stop-and-go mode if the display panel needs to be tested and inspected by a driving scheme rather than simple voltage application to rollers 51 and 53. However, another set of rollers similar to rollers 53, 54a and 54b, respectively, may be installed in a downstream position to allow continuous testing and inspection of two color states without interruption. In this scenario, opposite voltages (in relation to the ground voltage applied by the ground voltage roller 51) are applied to roller 53 and the testing voltage roller downstream. In both cases as illustrated, the display medium layer of the display panel is in contact with the testing voltage roller(s).

The display panel (50) is expressed as a single layer in FIG. 5 for convenience; but it in practice comprises a conductive layer and a display medium layer, as explained above. Only the exposed edge (14a) of the conductive layer (12) and the corresponding substrate layer (11) are allowed to pass through the gap between the ground voltage roller (51) and a corresponding nip roller (52). In the display medium layer area, the display medium layer (13), the corresponding conductive layer (12) and the substrate layer (11) are allowed to pass through the gap between the testing voltage roller (53) and the two nip rollers 54a and 54b. In this figure, in order for the display medium layer to be in contact with the testing roller 53, the transparent conductive layer and the display medium layer are facing up in the ground voltage roller area. Therefore the ground voltage roller (51) is above the display panel while the corresponding nip roller is under the display panel.

In all of the methods illustrated, if the edge(s) (14a and 14b) of the transparent conductive layer, as shown in FIG. 1, are not already available, the edge(s) of the transparent conductive layer on the, leading end of a display panel can be exposed by removing the display medium layer with a suitable solvent or mechanical wiping.

The different systems and methods as described may also be used in combination.

While rollers are exemplified, it is understood that any clamping devices which may serve the role of the rollers in the present invention can be used to substitute the rollers. Therefore any clamping devices having equivalent functions of the rollers are encompassed within the scope of the present invention.

In addition to roll-to-roll testing and inspection, the principle and set-up of the systems as shown in FIGS. 2a and 4 can be used for sheet-by-sheet testing and inspection of a display panel. In the sheet-by-sheet process, an electrical contacting tool (i.e., a clamp or conductive tape) is temporary adhered (or clamped) to the display panel. A ground voltage is applied to the transparent conductive layer and the electrical contacting tool has to move together with the display panel during testing. The electrical contacting tool plays the same role as the ground voltage roller and its nip roller used in the previous embodiments.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

It is therefore wished that this invention to be defined by the scope of the appended claims as broadly as the prior art will permit, and in view of the specification.

What is claimed is:

1. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer, wherein the ground voltage supplier is a set of rollers comprising a ground voltage roller and its corresponding nip roller, and the exposed edge of the conductive layer is in contact with the ground voltage roller;
   b) providing a testing voltage supplier to supply a testing voltage to the display medium layer;
   c) applying different voltages to the exposed edge of the conductive layer and the display medium layer; and
   d) inspecting for defects.

2. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a testing voltage supplier to supply a testing voltage to the display medium layer, wherein the testing voltage supplier is a set of rollers comprising a testing voltage roller and its corresponding nip roller, and the display medium layer is in contact with the testing voltage roller;
   c) applying different voltages to the exposed edge of the conductive layer and the display medium layer; and
   d) inspecting for defects.

3. The method of claim 2, wherein the ground voltage supplier is a set of rollers comprising a ground voltage roller and its corresponding nip roller, and the exposed edge of the conductive layer is in contact with the ground voltage roller.

4. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a testing voltage supplier to supply a testing voltage to the display medium layer, wherein the testing voltage supplier is a testing voltage conductive film and a set of rollers comprising a testing voltage roller and its corresponding nip roller; the testing voltage conductive film has a conductive surface which is in contact with the display medium layer and the testing voltage roller;
   c) applying different voltages to the exposed edge of the conductive layer and the display medium layer; and
   d) inspecting for defects.

5. The method of claim 4, wherein the ground voltage supplier is a set of rollers comprising a ground voltage roller and its corresponding nip roller, and the exposed edge of the conductive layer is in contact with the ground voltage roller.

6. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a testing voltage supplier to supply a testing voltage to the display medium layer, wherein the testing voltage supplier is a testing voltage roller which is in contact with the display medium layer;
   c) applying different voltages to the exposed edge of the conductive layer and the display medium layer; and
   d) inspecting for defects.

7. The method of claim 6, wherein the ground voltage supplier is a set of rollers comprising a ground voltage roller and its corresponding nip roller, and the exposed edge of the conductive layer is in contact with the ground voltage roller.

8. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a first testing voltage supplier and a second testing voltage supplier to supply testing voltages to the display medium layer, wherein said first testing voltage supplier is a first set of rollers comprising a first testing voltage roller and its corresponding nip roller, said second testing voltage supplier is a second set of rollers comprising a second testing voltage roller and its corresponding nip roller, and the display medium layer is in contact with the first testing voltage roller and the second testing voltage roller;
   c) applying a voltage to the second testing voltage roller which is opposite of that applied to the first testing voltage roller in relation to the voltage applied to the exposed edge of the conductive layer; and
   d) inspecting for defects.

9. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a first testing voltage supplier and a second testing voltage supplier to supply testing voltages to the display medium layer, wherein said first testing voltage supplier is a first set of rollers comprising a first testing voltage roller and its corresponding nip roller, and the display medium layer is in contact with the first testing voltage roller, and said second testing voltage supplier is a testing voltage conductive film and a second set of rollers comprising a second testing voltage roller and its corresponding nip roller, and the testing voltage conductive film has a conductive surface which is in contact with the display medium layer and the second testing voltage roller;
   c) applying a voltage to the second testing voltage roller which is opposite of that applied to the first testing voltage roller in relation to the voltage applied to the exposed edge of the conductive layer; and
   d) inspecting for defects.

10. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a first testing voltage supplier and a second testing voltage supplier to supply testing voltages to the display medium layer, wherein said first testing voltage supplier is a testing voltage conductive film and a first set of rollers comprising a first testing voltage roller and its corresponding nip roller, and the testing voltage conductive film has a conductive surface which is in contact with the display medium layer and the first testing voltage roller, and said second testing voltage supplier is a second set of rollers comprising a second testing voltage roller and its corresponding nip roller, and the display medium layer is in contact with the second testing voltage roller;
   c) applying a voltage to the second testing voltage roller which is opposite of that applied to the first testing voltage roller in relation to the voltage applied to the exposed edge of the conductive layer; and
   d) inspecting for defects.

11. A method for testing and inspecting a display panel comprising a conductive layer and a display medium layer in contact with the conductive layer, wherein said conductive layer has at least one exposed edge, the method comprises:
   a) providing a ground voltage supplier to supply a ground voltage to the exposed edge of the conductive layer;
   b) providing a first testing voltage supplier and a second testing voltage supplier to supply testing voltages to the display medium layer, wherein said first testing voltage supplier is a first testing voltage conductive film and a first set of rollers comprising a first testing voltage roller and its corresponding nip roller, and the first testing voltage conductive film has a conductive surface which is in contact with the display medium layer and the first testing voltage roller, and said second testing voltage supplier is a second testing voltage conductive film and a second set of rollers comprising a second testing voltage roller and its corresponding nip roller, and the second testing voltage conductive film has a conductive surface which is in contact with the display medium layer and the second testing voltage roller;
   c) applying a voltage to the second testing voltage roller which is opposite of that applied to the first testing voltage roller in relation to the voltage applied to the exposed edge of the conductive layer; and
   d) inspecting for defects.

* * * * *